(12) United States Patent
Morich et al.

(10) Patent No.: US 8,533,732 B2
(45) Date of Patent: *Sep. 10, 2013

(54) LANDSCAPE REORGANIZATION ALGORITHM FOR DYNAMIC LOAD BALANCING

(75) Inventors: Kai Morich, Hockenheim (DE); Oliver Rebholz, Siebeldingen (DE); Vladislav Leonkev, Sandhausen (DE)

(73) Assignee: SAP AG, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/407,140

(22) Filed: Feb. 28, 2012

(65) Prior Publication Data

US 2012/0159509 A1   Jun. 21, 2012

Related U.S. Application Data

(63) Continuation of application No. 11/393,927, filed on Mar. 29, 2006, now Pat. No. 8,127,299.

(51) Int. Cl.
*G06F 9/46* (2006.01)

(52) U.S. Cl.
USPC ............................................ 718/105; 718/104

(58) Field of Classification Search
USPC ........................................................ 718/105
See application file for complete search history.

(56) References Cited

U.S. PATENT DOCUMENTS 5,506,987 A *  4/1996  Abramson et al. ............ 718/103
7,693,983 B1 *  4/2010  Gupta et al. .................. 709/224

* cited by examiner

*Primary Examiner* — Meng An
*Assistant Examiner* — Blake Kumabe
(74) *Attorney, Agent, or Firm* — Mintz Levin Cohn Ferris Glovsky and Popeo, P.C.

(57) ABSTRACT

A method and system for reorganizing a distributed computing landscape for dynamic load balancing is presented. A method includes the steps of collecting information about resource usage by a plurality of hosts in a distributed computing system, and generating a target distribution of the resource usage for the distributed computing system. The method further includes the step of generating an estimate of an improvement of the resource usage according to a reorganization plan.

12 Claims, 5 Drawing Sheets

LANDSCAPE REORGANIZATION ALGORITHM FOR DYNAMIC LOAD BALANCING

CROSS REFERENCE TO RELATED APPLICATIONS

This application is a continuation and claims the benefit of priority under 35 U.S.C. §120 of U.S. patent application Ser. No. 11/393,927, filed Mar. 29, 2006, entitled "Landscape Reorganization Algorithm For Dynamic Load Balancing", which the disclosures of the priority applications are incorporated by reference herein.

BACKGROUND

This disclosure relates generally to distributed computing systems, and more particularly to techniques for dynamic load balancing on distributed computing systems using a landscape reorganization algorithm.

If an information processing application is distributed over multiple hosts, a standard system administration goal is to balance the workload among all the available hosts. A balanced load is such that all the hosts have a roughly equal usage of CPU and memory resources. To achieve such an equal resource usage, a reorganization mechanism can be used to move workload from one host to another during normal operations, that is, in real time or dynamically.

The application must be suited for a reorganization mechanism in the following respects: the application must handle multiple objects that can be separated from each other; the objects should not be difficult to move, which implies for example that they should not be locked for a long periods of time; and it should be possible to split the objects into smaller objects.

A stateless application, in which session-specific information about the state of the system is not carried over from one session to another, is well suited for such dynamic reorganization. For example, the SAP NetWeaver information search and retrieval service TREX is well suited for such dynamic reorganization because searching is stateless.

SUMMARY

In general, this document discusses a process for dynamic load balancing. In particular, a system and method for dynamic load balancing on distributed computing systems uses a landscape reorganization algorithm. The reorganization process is split into several main steps. First, information is collected about resource usage. This includes static information, for example concerning the total sizes of objects, and dynamic information, such as CPU usage per day. Second, a target distribution is calculated, the resource usage improvement is estimated, and a reorganization plan is created consisting of steps that must be executed to transform the actual distribution into the target distribution. Finally, the plan is executed. To minimize the impact on system performance, implementations of the reorganization are highly automated and included in normal administration tasks.

In one aspect, a method and algorithm includes collecting information about resource usage by a plurality of hosts in a distributed computing system. The method further includes generating a target distribution of the resource usage for the distributed computing system. The method further includes generating an estimate of an improvement of the resource usage according to a reorganization plan.

In another aspect, a method and algorithm includes creating a target data structure that is similar to a current data structure but representing the plurality of hosts as empty of objects. The method further includes forming two groups of objects based on large objects and small objects of the current data structure. The method further includes reorganizing the current data structure according to selection of new hosts for the large objects and small objects based on memory and central processing unit (CPU) values.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a landscape reorganization process, and systems for executing the same, for dynamic load balancing on distributed computing systems.

Figure 1:
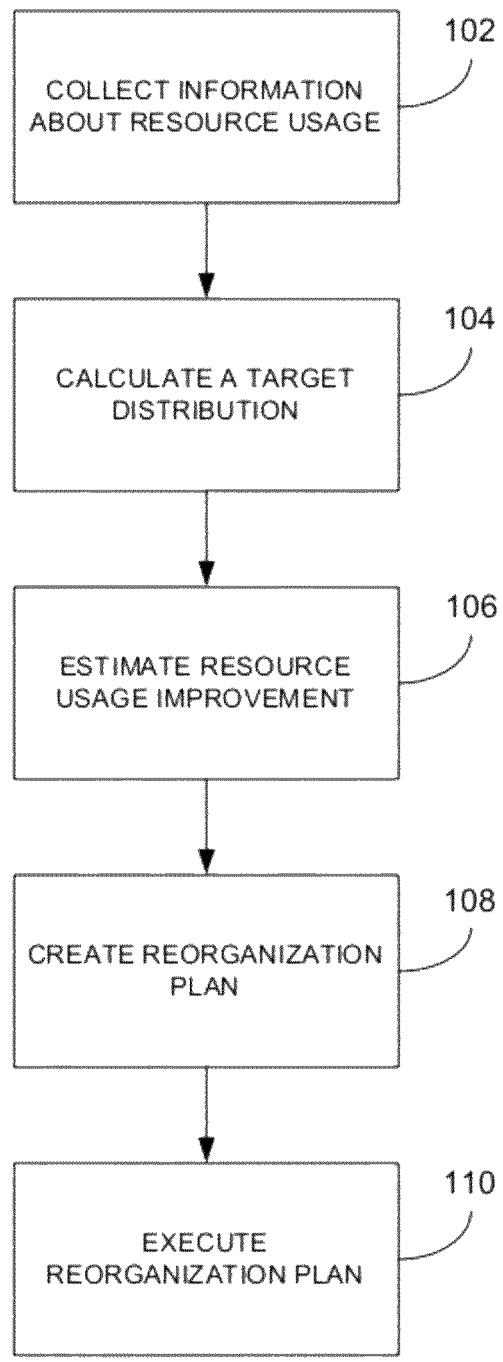
FIG. 1 is a flowchart of a computing landscape reorganization process.

The reorganization process is split into a number of steps as shown in FIG. 1. First, at 102, information about resource usage is collected. This information includes static information, for example concerning the total sizes of objects, and dynamic information, such as CPU usage per day. Next, at 104, a target distribution is calculated, the resource usage improvement is estimated at 106, and a reorganization plan is created consisting of steps that must be executed to transform the actual distribution into the target distribution, at 108. Finally, the reorganization plan is executed at 110. The three steps of the load balancing process are described in turn.

Step 102 collects information about resource usage. This includes static information, for example concerning the total sizes of objects, and dynamic information, such as CPU usage per day. In most implementations, the available information about the current resource usage is likely to be incomplete or inaccurate.

To measure exact resource usage, the application source code may be instrumented to count the exact memory (RAM) usage per object or to time the exact processor (CPU) usage per object, but such exact measurement may be impossible in practice. For example, exact measurement of the CPU usage may not be possible in a multithreaded application or if running on a multiprocessor host.

In accordance with some embodiments, it is sufficient to obtain values that allow objects to be compared with each other, as opposed to measuring the exact memory or CPU usage. The absolute values that the operating system provides at process level can be used to correct the comparative values for the various objects existing in one process. A memory usage value can be estimated by the application.

The application uses a read-write lock to prevent updates to an object while the object is in use. This lock may advantageously be used to estimate the CPU usage. In accordance with this advantageous usage, the number of lock requests and the duration of each lock is measured. In a multithreaded process, an object may be locked for read access by multiple parallel threads. In such cases, a counter is incremented multiple times, but the lock time only measures the elapsed time and therefore does not reflect this concurrency. Lock time is nevertheless a reasonable reflection of CPU usage because if multiple threads are active on a single CPU the total time will increase.

The CPU usage is not measured as an absolute value, as an absolute value is unnecessary for comparing objects with each other. As the application is typically the only application that runs on a host, the absolute measure of total CPU usage provided by the operating system can be used to correct the values.

Figure 2:
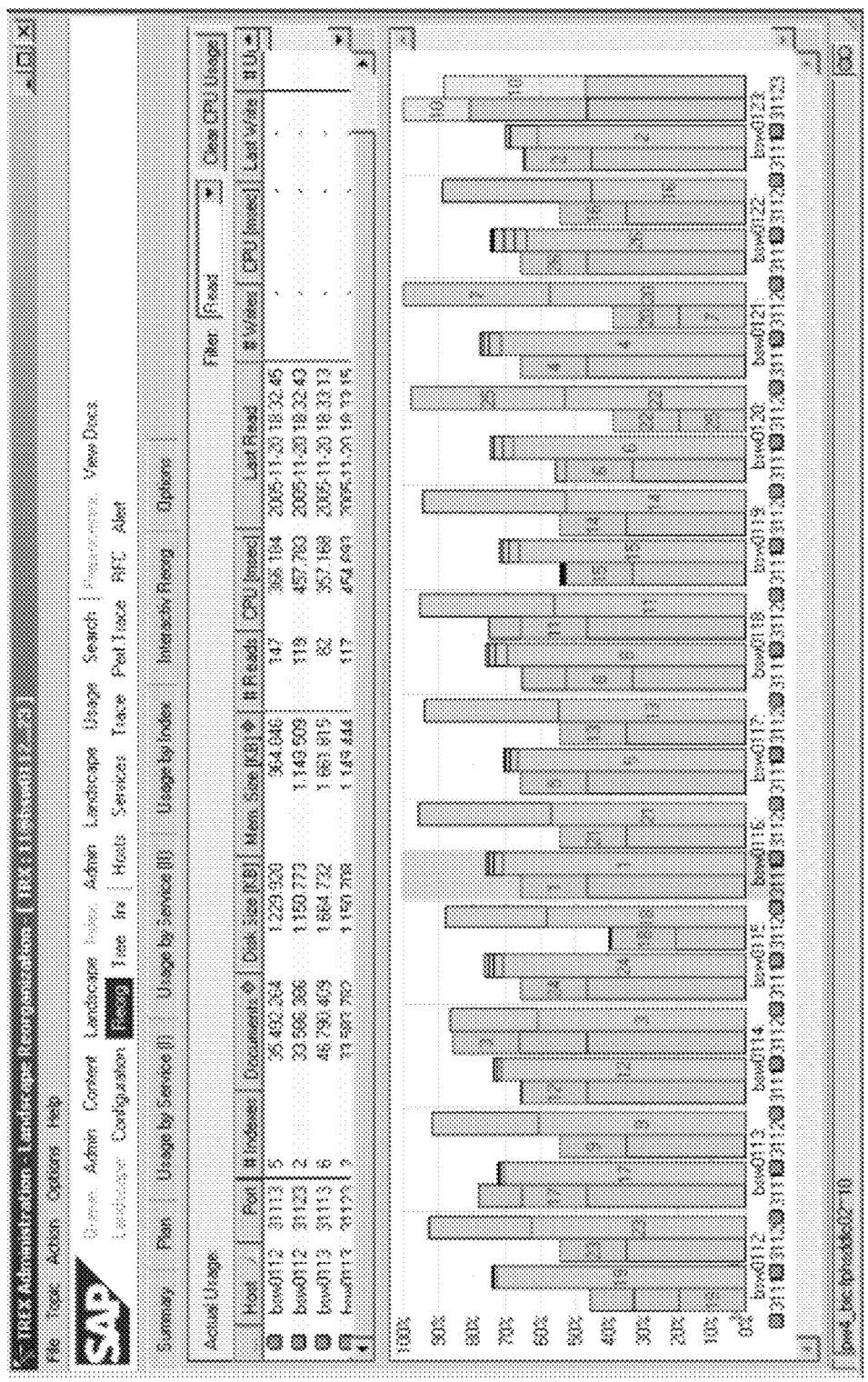
FIG. 2 depicts a user screen for monitoring information about resource usage.

FIG. 2 illustrates one implementation of a user screen, showing information for resource usage in a landscape composed of twelve hosts, bsw0112 to bsw0123, where each host runs two instances of the application process. A graphical representation, such as shown in FIG. 2, gives a human observer a direct insight into unequal resource usage. In FIG. 2, the resources used are colored a particular color (i.e. green) for memory and a different color (i.e. blue) for CPU, and are stacked for all processes running on each individual host.

The second step is to calculate a target load distribution over the available hosts, to balance their memory and CPU usage, and to create a reorganization plan to achieve the target distribution.

The calculation of a new distribution should attempt to optimize for the following five goals: minimize memory usage; minimize CPU usage; equalize the number of objects per host (this has the effect of tending to equalize the usage of such resources as file handles and sockets); minimize transport costs when multiple objects are needed by a search query; and minimize transport costs when reorganizing.

A mathematically optimal algorithm for these goals is not required, because its run time would be unacceptable when handling landscapes with thousands of objects. Given that the values for the current resource usage are only estimations, the algorithm need not be very complex. Instead, the goals are ordered according to priority and the algorithm determines a preferred distribution.

For optimization, memory usage should be treated as a hard fact. Experiments with a prototypical implementation confirm that optimizing for CPU usage is slightly better than optimizing for memory, because an application that runs out of memory can crash, while CPU usage is dependent on and proportionate to the size of an object that uses it. However, when attempting to optimize for CPU usage, the optimization calculation largely depends on a sampled CPU usage, which in turn depends on user behavior. In contrast, information about memory usage is available in static form, and therefore is easier to measure and more reliable to use.

In preferred embodiments, the algorithm implements several subsidiary goals. First, objects are sorted by size in memory, starting with the largest. This enables the large objects to be kept on hosts on which they are currently located, analogously to stable sort algorithms that preserve an existing order. Second, objects of similar size (for example if they differ by less than 10 percent) are treated as being equal in size. This also increases the probability that they will stay on their current host.

Third, split objects are recognized and their parts are distributed on different hosts. FIG. 2 depicts an example in which there is one object with more than twenty parts. The algorithm limits the number of parts of one object put on a single host, to prevent the situation that the CPU usage becomes significantly higher on this host when this object is accessed.

Fourth, two groups of objects are distinguished, large objects and small objects. All large objects are distributed as described above, and then the small objects are used to fill up each host to an equal number of objects, because these small objects have a larger impact on file handles and sockets than they do on memory and CPU usage. Fifth, the object model for the implemented search service includes predefined join path definitions that specify which objects may be required to respond to a search query. The definitions are used to group the small objects so as to reduce the network traffic caused by a search query.

Figure 3:
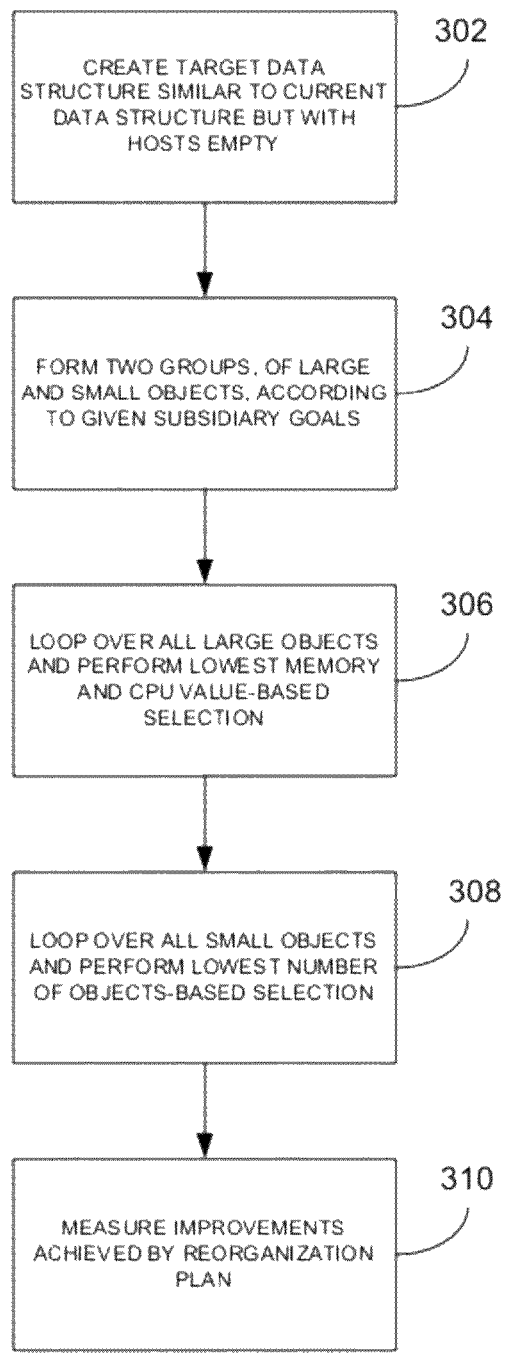
FIG. 3 is a flowchart of a computing landscape reorganization algorithm.
Figure 4:
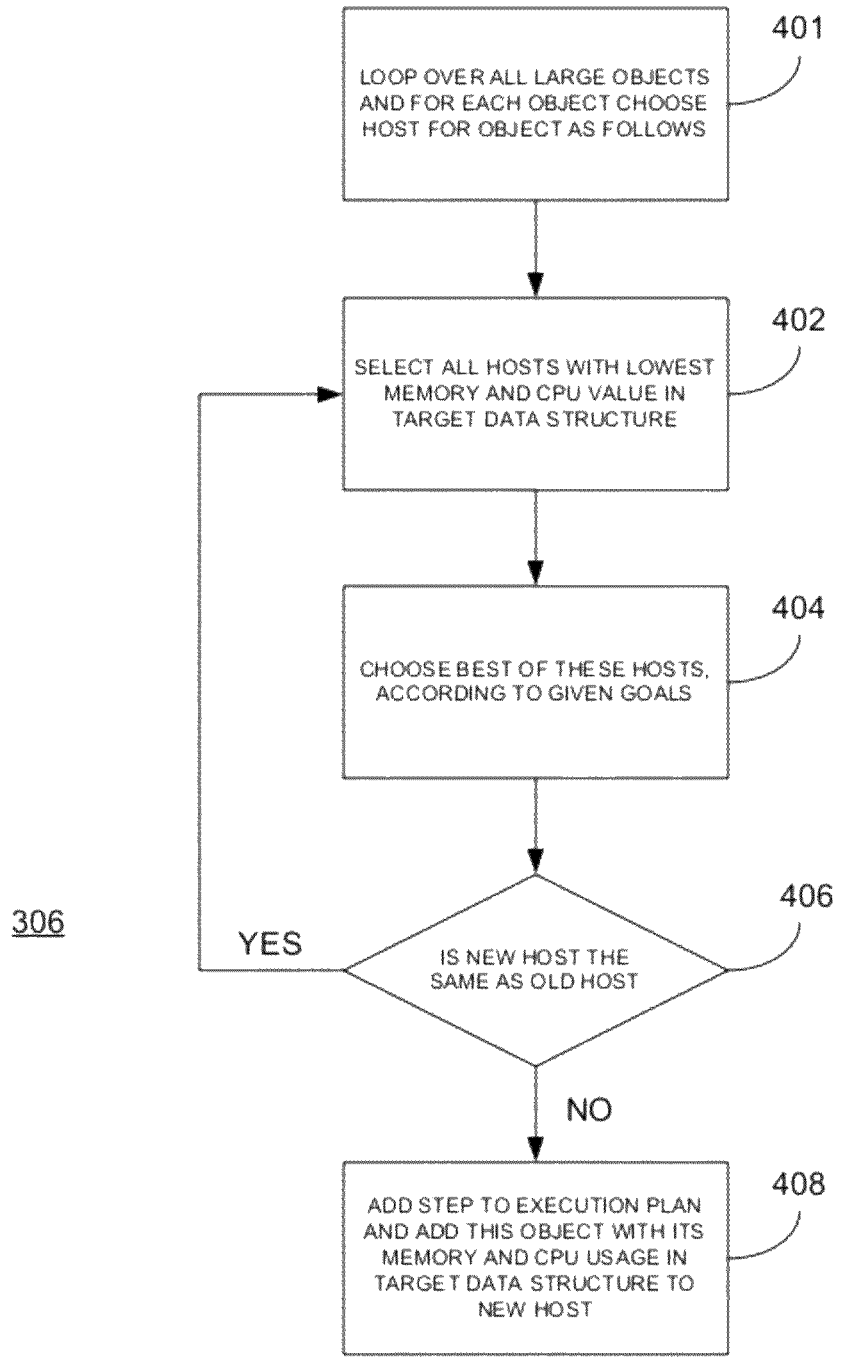
FIG. 4 is a flowchart of a reorganization algorithm for large objects.
Figure 5:
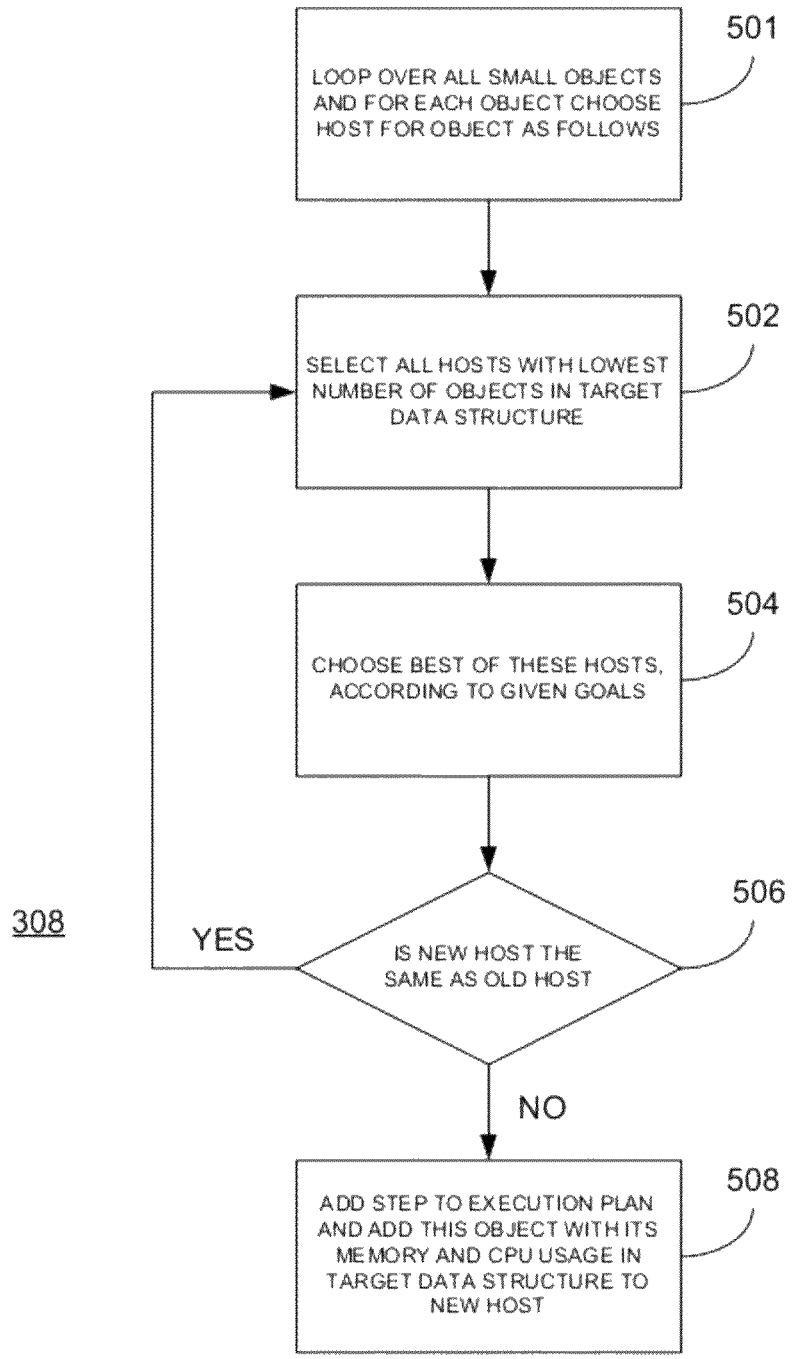
FIG. 5 is a flowchart of a reorganization algorithm for small objects.

In some embodiments, as illustrated in FIG. 3, a landscape reorganization algorithm proceeds as follows. At 302, a data structure is created that is similar to the data structure that describes the current memory and CPU distribution as shown in FIG. 2, except that in the new data structure all hosts are empty, with zero memory and CPU values. At 304, two groups of objects are distinguished, between large objects and small objects, as stated in the subsidiary goals above. At 306, a loop is executed over all large objects, and for each object a host is selected based in part on memory and CPU values of the host, as illustrated in FIG. 4. At 308, a loop is executed over all small objects, and for each object a host is selected based in part on the number of objects on the host, as illustrated in FIG. 5. At 310, the improvements achieved by the reorganization are measured, for example to measure the numerical decrease in maximum memory usage.

FIG. 4 illustrates the step of 306 in greater detail. At 401, a loop is executed over all large objects, and for each object a host is selected based in part on memory and CPU value. At 402, all hosts with the lowest memory and CPU value in the new data structure are selected. At 404, the best of these hosts is chosen, according to the above goals. At 406, it is determined whether the new host is the same as the old host. If so, then the process continues with the loop. If not, a step is added to the execution plan at 408, and this object with its memory and CPU usage in the new data structure is added to the new host. For each step in the reorganization plan, the engine performing the reorganization process sends the old host an "unassign" event to tell it that it is no longer responsible for the relevant object, and then sends the new host an "assign" event to assume responsibility for the object.

FIG. 5 illustrates the step of 308 in greater detail. At 501, a loop is executed over all small objects, and for each object a host is selected based in part on the number of objects on the host. At 502, all hosts with lowest number of objects in the new data structure are selected. At 504, the best of these hosts is chosen, according to the above goals. At 506, it is determined whether the new host is the same as the old host. If so, then the process continues with the loop. If not, a step is added to the execution plan at 508, and this object with its memory and CPU usage in the new data structure is added to the new host.

The execution plan now contains a list of commands that say in effect "move object x from host a to host b" for suitable values of x, a and b. The new data structure contains the same information as the old data structure, except that the new data structure describes the situation as it would be after the reorganization.

Before the move to the new host is performed, the object on the old host is marked as read-only. This allows the object to be copied in background and used for searches. Requests to modify the object will be blocked as long as it is marked as read-only. Finally the new object is marked as active and the old object is removed. Since all the objects are typically located on a filer, a move takes only a few seconds.

To reduce the performance impact that would arise from a reorganization in the middle of a workday, step 306 can be decoupled from steps 302 and 304. In this scenario, steps 302 and 304 are executed regularly, for example once a day, and if a threshold in improvement is exceeded, for example if the improvement would be more than 30 percent, the administrator is informed that a reorganization is recommended. Then the administrator can either trigger step 306 to occur immediately or alternatively schedule it for the following night in the case that overnight at most a small number of modifying calls will occur.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A computer-implemented method comprising:
collecting, using one or more processors, information about an actual load distribution of resource usage by a distributed computing system comprising a plurality of hosts, the actual load distribution comprising, for a predetermined interval, a total size in memory of each of a plurality of objects accessed by an information processing application implemented on the distributed computing system and CPU usage by each of the plurality of hosts;
generating, using the one or more processors, a reorganization plan by calculating a target load distribution of the resource usage by the distributed computing system, the target load distribution comprising a balancing of the CPU usage by each of the plurality of hosts to execute the plurality of objects, the plurality of objects including one or more split objects defined by the reorganization plan, at least one split object having more than one part, the reorganization plan limiting a number of parts of the split object to be executed on each host;
identifying, by the one or more processors, the plurality of objects as either large objects or small objects;
distributing, by the one or more processors, the small objects across the plurality of hosts to an approximately equal number of objects per host according to the reorganization plan to transform the actual load distribution into the target load distribution; and
executing, by the plurality of hosts of the distributed computing system, the plurality of objects according to the reorganization plan while retaining the large objects on their current hosts.

2. A method in accordance with claim 1, wherein the information includes static information that comprises the total size of each of the plurality of objects.

3. A method in accordance with claim 1, wherein the information includes dynamic information that comprises the CPU usage by each of the plurality of hosts per the predetermined interval.

4. A method in accordance with claim 1, wherein each split object has more than one part.

5. A method in accordance with claim 1, further comprising distributing the more than one part of at least one of the one or more split objects on different hosts of the plurality of hosts.

6. A method in accordance with claim 1, wherein collecting information further includes:
measuring, using the one or more processors, a number of read-write lock requests issued from the information processing application for a subset of the plurality of objects provided by each host of the plurality of hosts and a duration associated with each read-write lock request; and
estimating, using the one or more processors, the CPU usage for each host based on the number and duration.

7. A computer program product comprising a non transitory computer-readable storage medium including instructions that, when executed by one or more processors, perform operations comprising:
collect information about an actual load distribution of resource usage by a distributed computing system comprising a plurality of hosts, the actual load distribution comprising, for a predetermined interval, a total size in memory of each of a plurality of objects accessed by an information processing application implemented on the distributed computing system and CPU usage by each of the plurality of hosts;
generate a reorganization plan by calculating a target load distribution of the resource usage by the distributed computing system, the target load distribution comprising a balancing of the CPU usage by each of the plurality of hosts to execute the plurality of objects,
the plurality of objects including one or more split objects defined by the reorganization plan, at least one split object having more than one part, the reorganization plan limiting a number of parts of the split object to be executed on each host;
identify the plurality of objects as either large objects or small objects;
retain the large objects on their current hosts;
distribute the small objects across the plurality of hosts to an approximately equal number of objects per host according to the reorganization plan to transform the actual load distribution into the target load distribution; and
execute the plurality of objects according to the reorganization plan.

8. A computer program product in accordance with claim 7, wherein the information includes static information that comprises the total size of each of the plurality of objects.

9. A computer program product in accordance with claim 7, wherein the information includes dynamic information that comprises the CPU usage by each of the plurality of hosts per the predetermined interval.

10. A computer program product in accordance with claim 7, wherein the operations further comprise: distributing the more than one part of at least one of the one or more split objects on different hosts of the plurality of hosts.

11. A computer program product in accordance with claim 7, wherein the instructions to collect information further include instructions to:
measure a number of read-write lock requests issued from the information processing application for a subset of the plurality of objects provided by each host of the plurality of hosts and a duration associated with each read-write lock request; and
estimate the CPU usage for each host based on the number and duration.

12. A computer-implemented method comprising:
collecting, using one or more processors, information about an actual load distribution of resource usage by a distributed computing system comprising a plurality of hosts, the actual load distribution comprising, for a predetermined interval, a total size in memory of each of a plurality of objects accessed by an information processing application implemented on the distributed computing system and CPU usage by each of the plurality of hosts;

generating, using the one or more processors, a reorganization plan by calculating a target load distribution of the resource usage by the distributed computing system, the target load distribution comprising a balancing of the CPU usage by each of the plurality of hosts to execute the plurality of objects, the target load distribution retaining large objects from the plurality of objects on current hosts in the actual load distribution, and distributing small objects from the plurality of objects across the plurality of hosts to an approximately equal number of objects per host to transform the actual load distribution into the target load distribution;

the plurality of objects including one or more split objects defined by the reorganization plan, at least one split object having more than one part, the reorganization plan limiting a number of parts of the split object to be executed on each host; and executing, by the plurality of hosts of the distributed computing system, the plurality of objects according to the reorganization.

\* \* \* \* \*